United States Patent [19]

Alvarez de Toledo

[11] Patent Number: 5,321,795
[45] Date of Patent: Jun. 14, 1994

[54] PATTERN ASSOCIATION CENTRAL SUBSYSTEM AND A PERCEPTION LEARNING SYSTEM

[76] Inventor: Santiago Alvarez de Toledo, Tilos, 4, 28023 Madrid, Spain

[21] Appl. No.: 705,300

[22] Filed: May 24, 1991

[51] Int. Cl.$^5$ ............................................. G06K 9/62
[52] U.S. Cl. ......................................... 395/11; 395/24
[58] Field of Search ................. 395/10, 902, 903, 904, 395/906, 21, 22, 11, 24

[56] References Cited

U.S. PATENT DOCUMENTS

| 3,245,050 | 4/1966 | McGrogan, Jr. | 395/21 |
|---|---|---|---|
| 4,760,604 | 7/1988 | Cooper et al. | 395/21 |
| 4,805,225 | 2/1989 | Claric | 395/21 |
| 4,829,451 | 5/1989 | Thomas et al. | 395/10 |
| 4,876,731 | 10/1989 | Loris et al. | 395/21 |
| 5,025,499 | 6/1991 | Inoue et al. | 395/10 |
| 5,046,019 | 9/1991 | Basehore | 395/11 |
| 5,060,278 | 10/1991 | Fukumizu | 395/22 |
| 5,092,343 | 3/1992 | Spitzer et al. | 395/22 |
| 5,109,275 | 4/1992 | Naka et al. | 395/22 |
| 5,109,475 | 4/1992 | Kosaka et al. | 395/22 |
| 5,146,541 | 9/1992 | Speidel | 395/21 |
| 5,162,899 | 11/1992 | Naka et al. | 395/22 |
| 5,167,006 | 11/1992 | Furuta et al. | 395/11 |
| 5,175,796 | 12/1992 | Refregier et al. | 395/22 |

FOREIGN PATENT DOCUMENTS 1-224804  9/1989  Japan ..................... 395/11

OTHER PUBLICATIONS

"Back-propagation Neural Network for Nonlinear Self-Tuning Adaptive Control" Chen et al, IEEE Control Systems Magazine, 1990.
"Neural Network Application for Autonomous Mobile Robots" Opitz et al, Inter. Neural Network Conf. INNC Jul., 1990.
"Mobile, Robot Control by a Structured Hierarchical Neural Network" Apr. 1990, Nagata et al, IEEE, 1990.
"Neural Network Architecture for Control", IEEE Control System Magazine, 1988.
Young, "Flow-of-Activation Processing", 1986, American Institute of Physics.
Lippmann, "Pattern Classification Using Neural Network", 1989 IEEE Communication Magazine.
Specht, "Probabilistic Neural Network for Classification, Mapping or Associative memory", IEEE Inter. Conf. Neural Network, Jul. 1988.
Guez et al, "Neuromorphic Architecture for Fast Adaptive Robot Control", 1988 IEEE.
Sobajic et al, "Robust control of Nonlinear system using pattern Recognition", proc. 1989 IEEE. conf. on Systems, Man, and Cybernetics.
Aleksander et al, "The Cognitive Challenge For Neural Architectures", Int. Neural Network conf. Jul. 1990.
Gary Josin, Robots Mate With Neural Nets, Many Styles Enrich Behavior, Neural Network Almanac 1990-91, Publisher R. C. Johnson, Cognizer Co. 333 S. State St. Suite 141, Lake Oswego, Oreg. 97034.

(List continued on next page.)

Primary Examiner—Allen R. MacDonald
Assistant Examiner—George Davis
Attorney, Agent, or Firm—Richard V. Westerhoff

[57] ABSTRACT

A general purpose acting intelligent system includes a pattern association central subsystem which modifies actions taken by an output subsystem through a statistical valuation of the positive or negative effects of associations based upon the proximity in time between perception patterns developed from responses by sensors in an input subsystem, and actions previously taken by the output subsystem in response to such perception patterns. The pattern association central subsystem also modifies output actions taken based upon statistical associations between perception patterns perceived by the input subsection and positive or negative results detected by the input subsection to speed up the response of the system.

20 Claims, 10 Drawing Sheets

OTHER PUBLICATIONS

L. Nguyen, et al, Neural Network Architecture For The Forward Kinematics Problem in Robotics Catalog of the Int. Joint Conf. on Neural Networks, San Diego, Calif., Jun. 17–21, 1990, IEEE Neural Networks Council, pp. III–415–420.

S. D. Wang et al., Self-Adaptive Neural Architectures for Control Applications, Catalog of the International Joint Conference on Neural Networks, San Diego, Calif., Jun. 17–21, 1990, IEEE Neural Networks Council, pp. III–309–314.

G. Xu, et al., Application of Neural Networks on Robot Grippers, Catalog of the International Joint Conference on Neural Networks San Diego, Calif., Jun. 17–21, 1990, IEEE Neural Networks Council, pp. III–337–342.

A. Patrikar et al., A Self-Organizing Controller for Dynamic Processes Using Neural Networks, Catalog of the International Joint Conference on Neural Networks, San Diego, Calif., Jun. 17–21, IEEE Neural Networks Council, pp. III–359–364.

T. Iwata, et al., Fuzzy Control Using Neural Network Techniques, Catalog of the International Joint Conference on Neural Networks, San Diego, Calif., Jun. 17–21, 1990, IEEE Neural Networks Council, pp. III–365–370.

G. Wang, et al., Unsupervising Adaption Neural-Network Control, Catalog of the International Joint Conference on Neural Networks, San Diego, Calif., Jun. 17–21, 1990, IEEE Neural Networks Council, pp. III–421–428.

T. Fukuda, et al., Neural Network Application for Robotic Motion Control, Catalog of the International Joint Conference on Neural Networks, San Diego, Calif., Jun. 17–21, 1990, IEEE Neural Networks Council, pp. III–447–451.

H. W. Werntges, Delta Rule-Based Neural Networks for Inverse Kinematics: Error Gradient Reconstruction Replaces the Teacher, Catalog of the Int'l Joint Conference on Neural Networks, San Diego, Calif., Jun. 17–21, 1990 IEEE Neural Network Council, pp. III–415–420.

1. P1 – A1 – PV

2. P2 – A2 – PV

3. P3 – A2 – NV

4. P4 – A3 – PV

5. P3 – A3 – NV

6. P5 – A1 – PV

7. P3 – A1 – PV

8. P7 – A1 – PV

9. P6 – A1 – PV

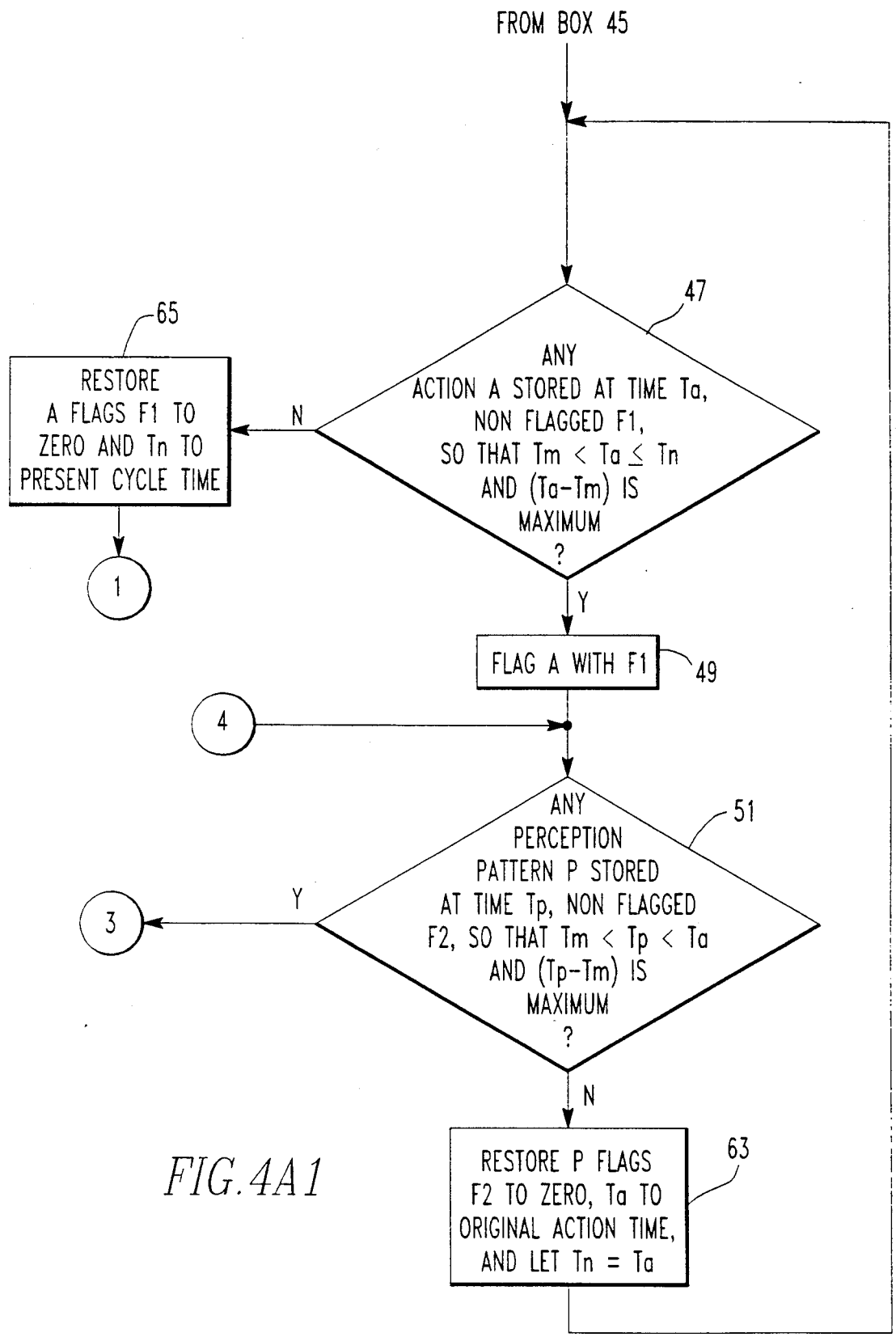
FIG.4A1

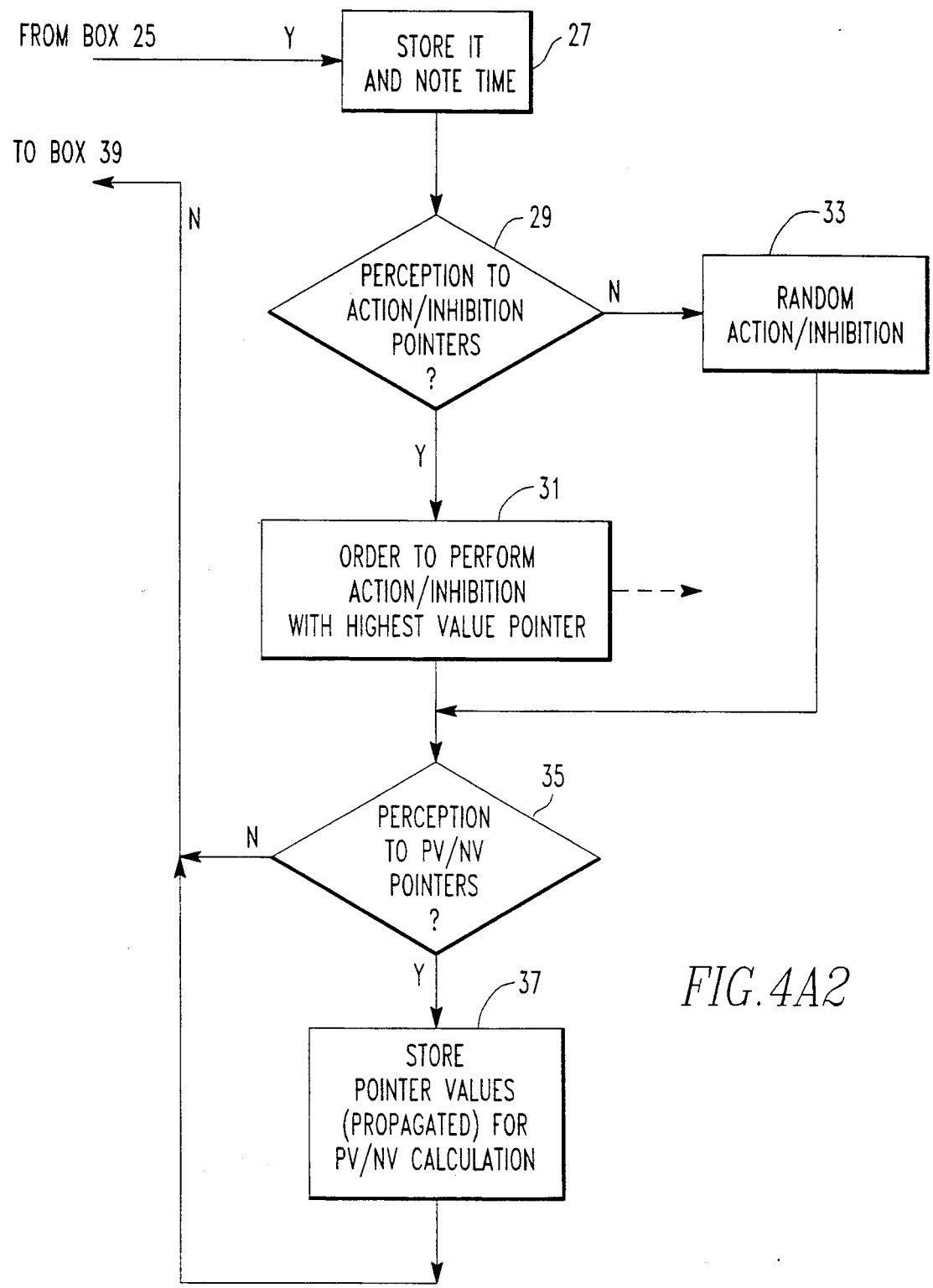
FIG.4A2

PATTERN ASSOCIATION CENTRAL SUBSYSTEM AND A PERCEPTION LEARNING SYSTEM

BACKGROUND OF THE INVENTION

1. Field of the Invention

This invention is directed to intelligent systems which perform actions based on "behavior" learned from experience. More particularly, it is directed to a general purpose intelligent system which modifies actions taken in response to a statistical valuation of the positive or negative effects of associations based upon the proximity in time between perception patterns developed from responses by input sensors, and actions previously taken in response to such perception patterns.

2. Background Information

Currently, there is a good deal of research being directed to the creation of artificial systems and devices with intelligent behavior. Some of these systems are based on symbolic serial programming, such as for example, expert systems. Others are mainly based upon connectivity or parallel distributed processing such as for example, neural networks. There has recently been considerable advance in the field of neural networks as many fields of application have been researched, such as for example, pattern recognition and machine vision. Much focus has also been placed on animal sensory perception and its possible emulation. Robotics currently has a mixed environment, but in most cases serial programming is employed.

While a great deal of research is being performed in these various detailed areas, there is a need to understand the general framework within which many different fields of knowledge and techniques can be organized. When the aim is not merely technological mimicry of living beings' partial areas, but a total acting intelligent system, the general architecture of such a system has to be defined. An essential task is to define the central system which monitors the peripheral input/output areas. There is therefore a need for both a general view of the total system and a description of the core which relates the sensorial perception input subsystem with the output subsystem.

The architecture and central core of general purpose acting intelligence systems have to be universal enough to be valid for any kind of environment, any kind of inputs or stimuli and outputs, such as movements and other reactions. But, at the same time, they have to be explicit enough so that they can be implemented in a system with specific sensory devices, specific outputs and in a concrete environment.

SUMMARY OF THE INVENTION

With the foregoing in mind, it is a main object of the invention to provide the general architecture and process for general purpose acting intelligent systems.

General purpose systems are those which are not specialized or devoted to any particular application or area, but able to perform in any of them. Some general purpose systems are acting intelligent. The term acting intelligent systems will be used herein to designate those general purpose systems which physically act, i.e., generate any output, movement included, mainly by experience, in a non-preprogrammed way. The general purpose acting intelligent systems select the most appropriate action, depending upon their previous experience in similar circumstances. In this way, those systems demonstrate their inherent intelligence.

In order to take advantage of previous experience and select the most appropriate action, the general purpose acting intelligent systems of the invention are able to perceive the external reality through a number of sensory devices, and can also move and generate different kinds of outputs. Additionally, they are able to detect if the result of their previous action was beneficial or disadvantageous, positive or negative. As, over time the grouping of a perception P followed by an action A and the value of a following result V take place repeatedly, the relationship between those elements is established statistically. The next time a perception of stimulus similar to P is perceived, if the result perceived in the previous case after the action A had a positive value PV, such action is repeated; if it had a negative value NV, the action is avoided or inhibited.

In addition, perceptions are also associated with positive and negative results independently of action taken, with these additional associations used to strengthen or weaken the association between perceptions, actions, and results. This speeds up reaction of a system to a perception which is repeated.

More particularly, the invention is directed to a general purpose acting intelligent system which comprises input means including sensors responsive to selected external stimuli to generate input signals, perception means responsive to the input signals to generate perception pattern signals classifying various input signals and combinations of input signals, and evaluation means comparing specified external stimuli to selected evaluation criteria to selectively generate positive and negative response signals. The system further includes output means which generate selected output actions which directly or indirectly may result over time in changes in at least one of the selected and specified external stimuli. Finally, the general purpose acting intelligent system of the invention includes processing means including means generating association signals associating specified output actions with the perception pattern signals statistically based on a repetition and a proximity in time of the perception pattern signal, the selected output action and the response signal (in this order), and means selecting the selected output actions to be generated by the output means based upon the association signals.

Association signals representing associations which generate a positive response signal are assigned a positive value while those resulting in a negative response signal are assigned a negative value. The assigned values may vary in magnitude dependent upon the magnitude of the response signal. Associations with positive value are promoted while those with negative values are inhibited. Furthermore, associations which are repeated with the same result following are increased in value while the magnitude of the association signal from an association which is not repeated, or is repeated with a different result, is decreased with time. In this way, the association reinforces associations which are repeated while removing over time associations which are no longer relevant.

In addition, the proximity in time between the perception pattern signal, the output action and the subsequent response signal also increases the magnitude of the association.

As another aspect of the invention, additional associations are created between perceptions and positive and negative responses independent of the actions taken. These propagated responses are reinforced or inhibited like the previously discussed associations with an action.

BRIEF DESCRIPTION OF THE DRAWINGS

A full understanding of the invention can be gained from the following description of the preferred embodiments when read in conjunction with the accompanying drawings in which:

FIGS. 4A1, 4A2 and 4B illustrates a flow chart for a suitable computer program for the system of FIG. 2 to perform the first part of the process of input and output association in accordance with the invention.

DESCRIPTION OF THE PREFERRED EMBODIMENTS

As previously mentioned, general purpose acting intelligent systems in accordance with the invention promote or inhibit particular output action based upon a statistical association between a perception, the action taken and the response which resulted. The following example serves to introduce this process of statistical association.

Figures 1, 2:
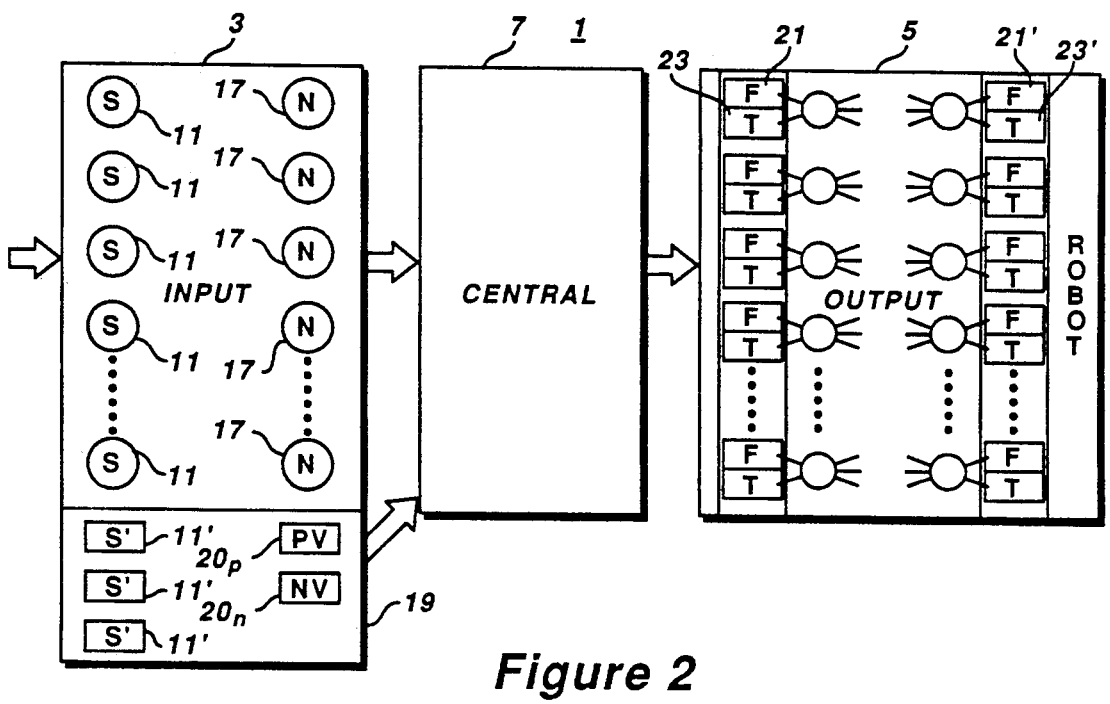
FIG. 1 is a list of chained events which illustrates the statistical learning process of the invention.
FIG. 2 is a schematic view of the architecture of a general purpose acting intelligent system according to the present invention.

FIG. 1 illustrates a sequence of events wherein the perceptions P and the actions A are numbered. The closer their numbers, the more similar they are. Thus, P1 is more similar to P2 than it is to P3, and much more than it is to P4 or P5. The same holds true for A1, A2, A3, etc. The listed chained events illustrated in FIG. 1 occur sequentially in time. In this sequence, in the first instance, a positive result, PV, was obtained with action A1, when P1 was perceived. Subsequently, a new positive value result PV occurred after action A2 was taken when P2 was perceived. In the third run, the system realized that P3 was more similar to P2 than to P1. Accordingly, the action previously associated with P2; namely, A2 was used. In so doing, the system reacted in the third event with a maximum probability of success according to the amount of information it had available. Unfortunately, it was not enough, and the results were of negative value, NV.

At event 4, the system reacted with A3 in response to perception P4 and received positive results. When the perception P3 was again observed at event 5, the system could not react A2 as it had previously for the same perception, since the result there was negative. The next most similar perceptions were P2 and P4 and their corresponding actions A2 and A3. Since A2 had already been discarded, the system reacted A3. Unfortunately, this was a new error, and the results obtained were of negative value, NV. In event 6, the system responded to the new perception P5 with response A1 and received a positive response PV. At event 7 when P3 was perceived again, the system could not repeat the action performed when such perception was detected for the first time (A2), or the last time (A3), since it produced negative values in both cases. The most similar perceptions recorded were P4 and P2, but in both cases, the same A3 and A2 actions were also performed. The system was therefore compelled to search for a recorded perception of not so close similarity, but with an action with good results. It found P1, repeated the same action A1, and finally got positive results PV.

At event 8, P7 was most similar to P5, and a repeated action A1 gave good results. Finally, when P6 was perceived at the chained event 9, and since its most similar recorded perception with a positive result was P7, the system repeated A1 and obtained the expected good results.

The system in the above way improves its probabilities of success by simply chaining statistically the perception, performed action and results that take place, one after the other. At the beginning, the system will establish, as in the example, many false relationships (e.g., results which really are not due to the previous action). But in the long run, the statistical repetition of some almost simultaneous perceptions, actions and results will end up establishing the true relationships. Even when there is additional time elapsing between perceptions, actions and results, the system will finally work out the right relationship based on the statistical grouping. The probability of success is permanently increasing while the system is perceiving. Every chained event is a step in an endlessly improving process based on an intelligent use of the previous experience.

In order to implement such a general purpose acting intelligent system, three modules are considered:
  a. a perception pattern input subsystem;
  b. an action/robotics output subsystem; and
  c. a pattern association central subsystem.

FIG. 2 illustrates schematically a general purpose acting intelligent system 1 incorporating these subsystems. The perception pattern input subsystem 3 may be a neural network, either built in hardware or simulated in software. Since these kinds of parallel distributed processing systems, so called neural networks, are part of the present state of the art and are commercialized in the market this subsystem is not in itself, new and will not be described in great detail.

The action/robotics output subsystem 5 provides different kinds of reactions (e.g., movement, applied force, light, sound, heat, etc.). It may be built in a conventional way and therefore also is not, per se, new and will not be described in detail.

The pattern association central subsystem 7, which is the core of the total system 1, together with the general architecture of such total system 1, is a main feature of the present invention.

The main aim of a general purpose acting Intelligent system 1 is to select the most appropriate action with the highest probabilities of success in order to obtain good results or to avoid bad ones. Such action is selected depending on the system's previous experience in similar circumstances and on the perceived present environment.

This way of acting shows the learning capacity of the system and its level of intelligence.

The architecture of this general purpose acting intelligent system 1 is, as previously described, a front end perception pattern input subsystem 3, an action/robotics output subsystem 5 and a pattern association central subsystem 7.

The functional principles of this general purpose acting intelligent system are the following:

Patterns of perceptions and patterns of actions (e.g., image pattern, movement routine) exist and are created in the input 3 and output subsystems 5 in a conventional way.

According to conventional rules some of the input signals or perception patterns are classified as beneficial to the system or as having positive value (PV). Other input signals or perception patterns are classified as disadvantageous to the system or as having negative value (NV). For instance, a temperature or a degree of humidity above a specific level may be classified as NV.

Patterns of perceptions and actions are associated in an excitation or inhibition mode, so that, the next time a similar perception pattern is active, the corresponding action is triggered or avoided.

This association is performed by the pattern association central subsystem 7, and the excitation or inhibition mode depends on the classification of the selected input signal or the perception pattern being PV or NV.

The characteristic PV or NV of a perception pattern can be propagated or transmitted to another perception pattern. It will be seen that this increases the learning capacity of the system.

The pattern association central subsystem 7 described here can work with any perception/action learning system with an input and an output subsystem.

The entire system 1 can be built within the present state of the art with today's available products. But, this pattern association central subsystem 7 can be used with more and more sophisticated perception neural networks 3 and action/robotics output subsystems 5, now or in the future. The beauty of it is that the central subsystem 7 does not need to be modified and, nevertheless, greatly increases the learning capacity and the intelligence of the total system. In short, the capacity of the total system is in proportion to the sophistication of the input subsystem 3 and the output subsystem 5, while the central subsystem 7 remains untouched.

Figure 3:
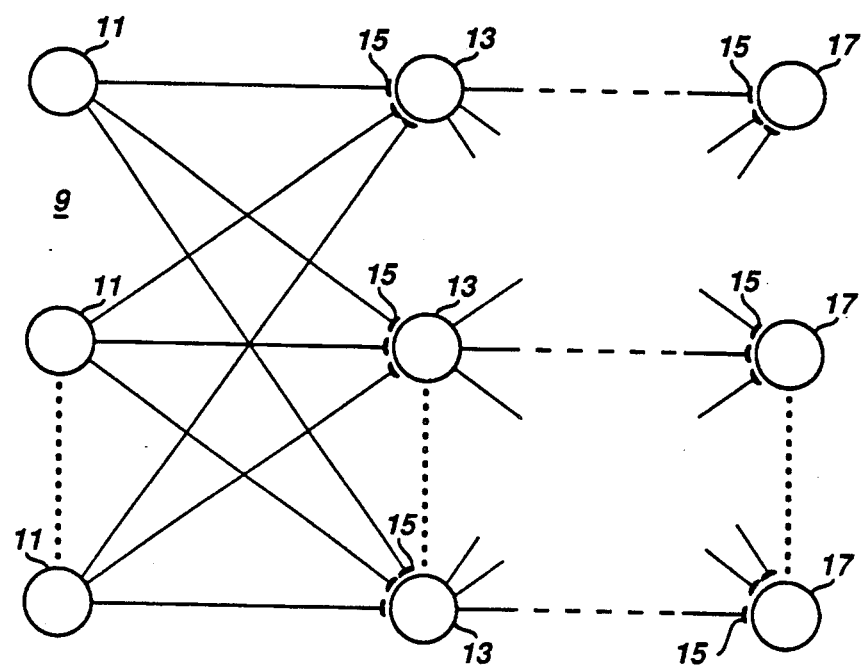
FIG. 3 is a schematic view of the perception pattern input subsystem which forms a part of the system shown in FIG. 2.

The perception pattern subsystem 3 can be any neural network devoted to perceive the external environment and create patterns out of such input. Those neural networks generally have a number of sensors which provide first level signals. The sensors may be of different kinds, being able to perceive light, sound, etc. Such a neural network 9 is illustrated in FIG. 3 where the first level sensors are identified by the reference character 11. Second elements in the neural networks are a number of neurons 13 disposed in several layers which form the network itself. The neurons 13 are interconnected through elements called weights 15, which increase or decrease the received signal. This signal is therefore distributed and modified layer after layer.

During a learning phase, the weights 15 are modified in such a way that the network 9 is able to classify an input as pertaining to a pattern or group, or recognize a specific characteristic of that input.

The learning phase may be supervised, when the operator modifies the weights 15 and monitors the network. It may also be unsupervised, in which case the network 9 evolves on its own, this mode being generally used to classify or group inputs into several patterns. In the unsupervised case, the network 9 may not have predefined patterns which can be recognized, but it classifies perceptions, associating them in groups, whose gravity center would be the pattern. Therefore, an operator telling the network 9 if it is right or wrong in its recognition activity, is no longer needed.

Usually, the last layer in the network has a number of output neurons 17, which become active when a pattern is finally identified.

The neural network 9 may be provided as a real net built in hardware or may be emulated by software.

Suitable neural networks 9 are well known today. For instance, the present state of the art in neural networks was reviewed at the International Joint Conferences of Neural Networks (IJCNN) at San Diego (April, 1990) and Paris (July, 1990).

Recent documents providing an overview on those networks are: *Introduction To Neural Networks* by Jeannette Stanley, edited by Sylvia Luedeking, Copyright 1988, 1989, 1990, California Scientific Software, Sierra Madre, Calif. 91024, third edition, March 1990; and *Straight Talk on Neural Networks* by Tom J. Schwartz, edited by The Schwartz Associates, Suite 150, 810 West El Camino Real, Mountain View, Calif. 94040, revised edition 1990.

Companies devoted specifically to neural networks for different applications are: NESTOR, SAIC, NEURALWARE, HNC, SYNAPTICS, etc. Additionally many computer manufacturers provide neural chips (HITACHI, INTEL, FUJITSU, etc.). Most of the main manufacturers offer today one or another kind of software neural networks.

The preferred neural networks 9 for a general purpose acting intelligent system 1 are the unsupervised type and are implemented in hardware. In this way, the learning process is permanently autonomous, showing a higher level of intelligence, and the reaction time is shorter than with a software simulation. In any event the system can work with a supervised kind of network, or a software simulated one.

The only special feature, which is not part of a neural network 9, but is needed in this input subsystem 3, is the positive/negative value pattern recognition unit 19 shown in FIG. 2. This unit allows the perception pattern input subsystem 3 to recognize the characteristics PV and NV in the input perceptions. For instance, a temperature above a specific level NV would be so detected by a sensor 11' and would activate an NV element 20n, or, in the case of a software simulated network, would store a NV value in a NV record. The method to detect such characteristics would be conventional as through a sensor 11' (thermal in this case) directly connected to the NV element 20, which would measure the level of temperature. Similarly a positive response would activate the PV element 20p or store a PV value in a PV software record.

The characteristics to be considered of positive or negative value depend upon the purpose for which the system is built, and are sheer conventions. For a general purpose acting intelligent system, the perceived stimuli which could damage the system, (a too high or low temperature, or any too extreme level of signal for the perception sensors 11) could be classified as NV, while a stimulus which is beneficial to the system (for example, the perception of energy being supplied) could be classified as PV. In this way, the action of the system can always be directed toward its self-preservation.

Each chosen NV and PV characteristic has to have a specific sensor 11' and receive the detected PV/NV level or intensity. The length of time during which the PV and NV elements 20p, 20n or records have such information is one cycle (the time cycle is described below in connection with the central subsystem).

In some special circumstances, the perception pattern input subsystem 3 could use an expert system instead of a neural network, or a mix of both. They would perform the same job of classifying perceptions as pertaining to a pattern or group, and recognizing specific characteristics in them. In any event, the information from the sensors 11 should be digitized so that the expert system can process it.

A conventional robot could be the basis for the output subsystem 5. A number of conventional features providing action other than movement (e.g., light, sound, etc.) could be added and commanded by the robot. There are a variety of elements which provide movement to presently available robots: wheels, limbs, such as, arms and legs, hands, fingers and grippers, etc. Different kinds of actuators provide various types of energy. Any combination of limbs and actuators may be used with the present invention. However, for the general purpose acting intelligent system 1, as is the case with the perception patterns, the more flexible and sophisticated the movements and actions available, the higher is the learning capacity and intelligence obtained. This rule, valid for both input and output subsystems, will be explained below.

Robots are generally provided with a controller, which contains the microprocessor and the software needed for its functioning. This software has a program with the routines for each of the movements or group of movements and actions of the robot. In a general purpose acting intelligent system incorporating the present invention, the robotics controller and the pattern association central subsystem 7 are interconnected, exactly as a main frame and a controller in a conventional teleprocessing network. The central subsystem 7 becomes the master and the controller (output subsystem 5) the slave.

The controller program must contain a flag 21 and a trigger 23 for each movement or action routine. Each flag 21 is set when its corresponding action is taken. It is turned off in the next time cycle. Each trigger 23 turns on its corresponding action routine upon receiving a specific signal from the central subsystem. The remainder of the program, controller and robot, is not dependent on this invention and may be any conventional model.

There is a more sophisticated set of flags and triggers which would add flexibility to the output subsystem 5. Each group of one trigger and one flag could be connected to one neuron of a neural network. At the other end of such network, another neuron would be connected to another trigger and another flag.

This flexible output subsystem 5 would make possible he creation of output patterns out of the fixed individual actions, through the neural network. The same way a combination of fixed input signals create a perception pattern, a combination of signals produced by fixed outputs may also create patterns through the same kind of neural networks. Both the perception pattern and the action pattern may be instantaneous and take a unit of time or take a lapse of time. The output signals of the individual action would feed a neural network configured as a reversed perception neural network (from right to left). In this case, the signals of an action being taken would have the role of input, and their combination would activate neurons in the last layer of the network (at the left side), when an output pattern, corresponding to the specific action being taken, is identified. Each last layer neuron of this output neural network would be connected to a flag 21 and a trigger 23 for its relationship with the central system, identifying when a combination of actions being taken coincides with an action pattern and triggering an output pattern, that is, a combination and sequence of individual actions. Each neuron of the first layer would be connected to a flag 21' and a trigger 23', to trigger the individual outputs and to inform the output neural network of the individual actions being taken. The information then goes from flags 21' to Flags 21 and the triggering goes from trigger 23 to trigger 23'. The conventional robotic elements of the output subsystem would be connected to flags 21' and triggers 23'.

Therefore, this output neural network put in between the two flag and trigger sets serves to create output or action patterns more sophisticated than just a fixed number of fixed individual actions. In this case, the symmetry of the system with an input and output neural networks is complete.

FIGS. 4A1, 4A2 and 4B show the process of input/output pattern association through a software flow chart. Although this process can be performed by a hardware central neural network, I have chosen a software simulated network embodiment for a clearer explanation. The process starts by asking at 25 if any perception (input pattern neuron 17 is active in the last input network layer). If a perception pattern is active, which means that a stimulus or group of stimuli have been recognized, the identification of such pattern, the neuron number, is stored at 27 together with the time when this has taken place. Then, the process asks at 29 if a pointer to an action was assigned to that perception pattern or neuron. This would mean that in the past such perception pattern was associated with a specific action. If such a pointer exists, an order is sent at 31 to the output subsystem 5 to activate the corresponding trigger 23 and therefore take the associated action (or inhibition).

Since the output subsystem 5 operates in parallel, the central subsystem 7 goes on. In case there was no pointer assigned to that perception, a random action or inhibition (lack of action) is performed at 33. Then, the program asks at 35 if a pointer to a propagated PV or NV was assigned to that perception pattern or neuron. This would mean that in the past such perception was sometimes followed by a positive or negative result (PV/NV); therefore, the corresponding PV/NV was propagated and now this originally neutral perception pattern activates it. Following at 37, in case the pointer exists, its value is stored for further calculation of the PV and NV final values at 45.

Then, or in the case when no perception pattern was active, the program asks at 39 if any action routine flag is "on" which would mean that an action was being taken at that time. If this is so, the identification of such routine is stored at 41 together with the time when this has taken place.

The above process allows the system to act according to previous experience and associations, through the pointers, and store the active perception patterns and action routines for new possible associations and therefore future actions.

The program next asks at 43 if either one of the PV or NV elements, 20p or 20n is "on", which means that the sensors 11' have detected a positive or negative characteristic or a propagated PV/NV has taken place and been stored. In case there were several values in the same cycle, the final value of the PV element is calculated at the maximum of all those PV values in that cycle, either directly from the sensors or propagated ones. The same is done to calculate the final value of the NV element. In short, the most positive and most negative values in one cycle are the ones finally taken into account. The necessary associations between perception and action patterns are then made at 47. If the obtained result had a positive value (PV), the previous action and perception patterns are associated. If the result was negative (NV) the previous action and perception patterns are specifically disassociated. Therefore, the next time the same perception takes place, the specific action is taken or inhibited, depending on the previously obtained results.

Figure 6:
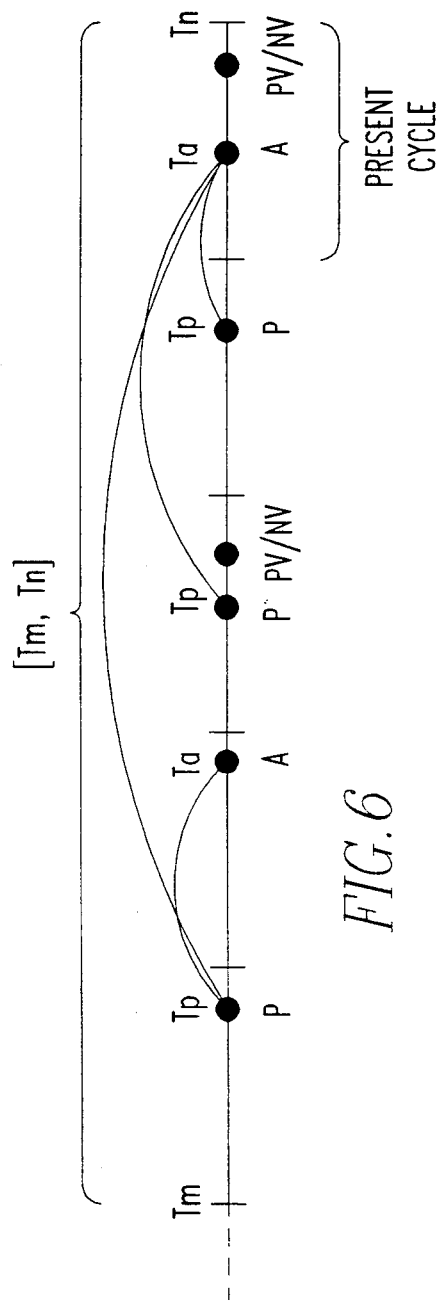
FIG. 6 is a time scale illustrating the associations between perceptions and actions in accordance with the invention.

An example will facilitate an understanding of this process. FIG. 6 illustrates a time scale with time cycles shown from Tm to Tn, the latter being the present cycle. Each cycle is estimated so that the maximum of one perception, one PV/NV and one action are possible during each cycle. The entire program routine can be run through before a new perception, PV/NV or action takes place.

Returning to FIG. 4A1, the program asks at 47 if any action routine identification was stored (at 41) during the present cycle or a number of previous ones, during time period Tm, Tn, (Ta may be any specific time during such period), provided it is not flagged by F1, and then selects the one which took place nearest to the present cycle, Tn. This action A is then flagged with F1 at 49.

Next, the program asks at 51 if any perception pattern identification was stored (at 27) during a number of cycles previous to the stored action, time period Tm−Tn, (Tp may be any specific time during such period), provided it is not flagged by F2. The perception P which took place nearest to the action time Ta is selected. Assuming that a perception took place, an action was then performed and a PV or NV was perceived, some association should be made between perception and action. Therefore, the question is posed at 53 in FIG. 4B whether an associating pointer from the perception pattern to the action routine already exists and the order is given at 55 to create one if it did not exist. Next, the pointer value is increased at 57 proportionally to the proximity of both the action to the present cycle and the perception to the action. The increase is also proportional to the PV/NV level and accordingly positive or negative and never above a level K. Depending on this pointer value and its positive or negative sign, a more or less stringent order is given at 31 to perform or inhibit such action. If there were a value in the PV element and a value in the NV element, in the same cycle, the value of the pointer will be the algebraic summation of both, taking the positive/negative signs into account, e.g., PV=+5 and NV=−3 result in a pointer value of +2.

The perception pattern identification is then flagged with F2 at 59. The loop (51–61) is repeated for all perception patterns which were stored some time before the referred action, in each case creating a different pointer.

Figure 4A:
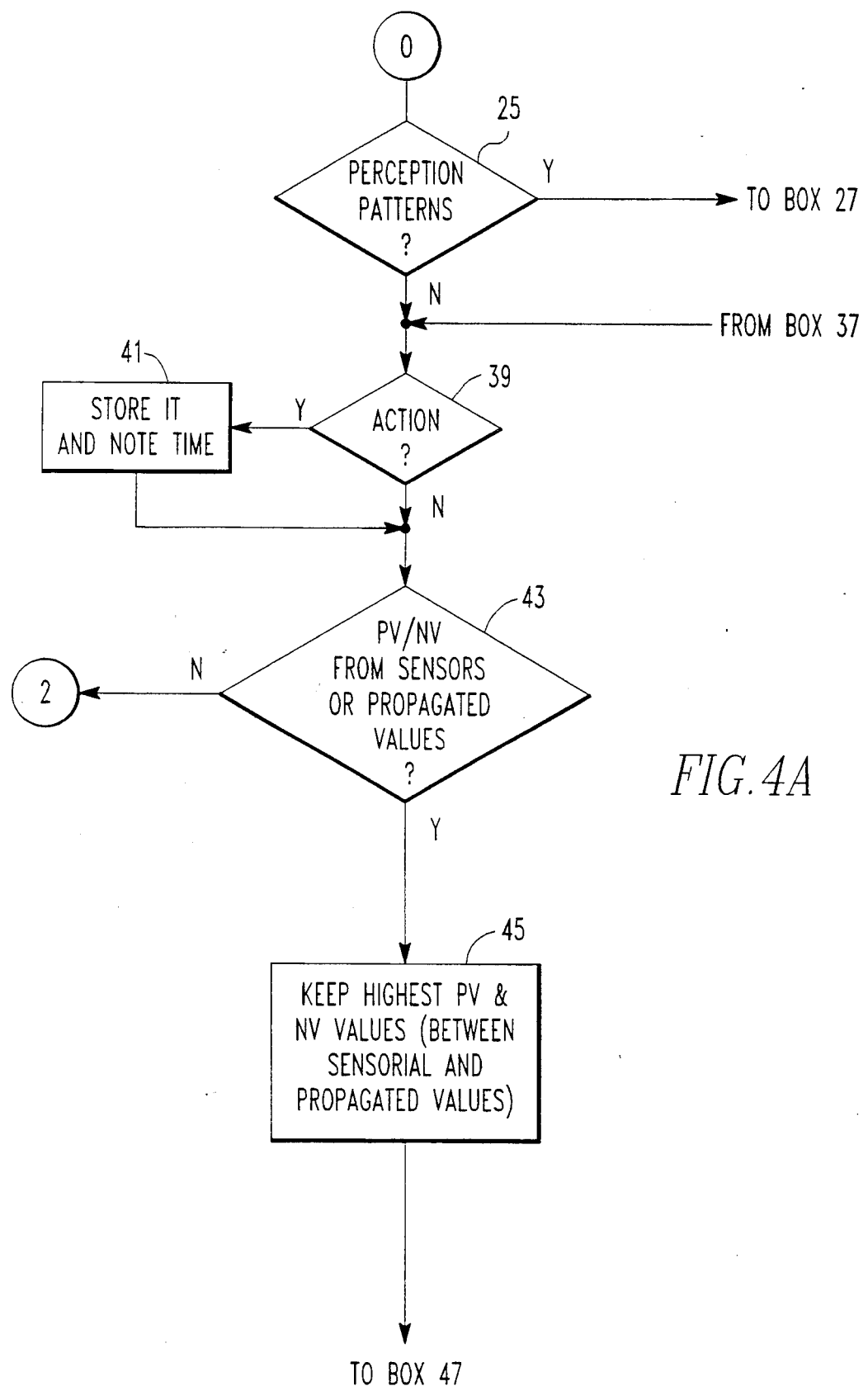
Figure 4B:
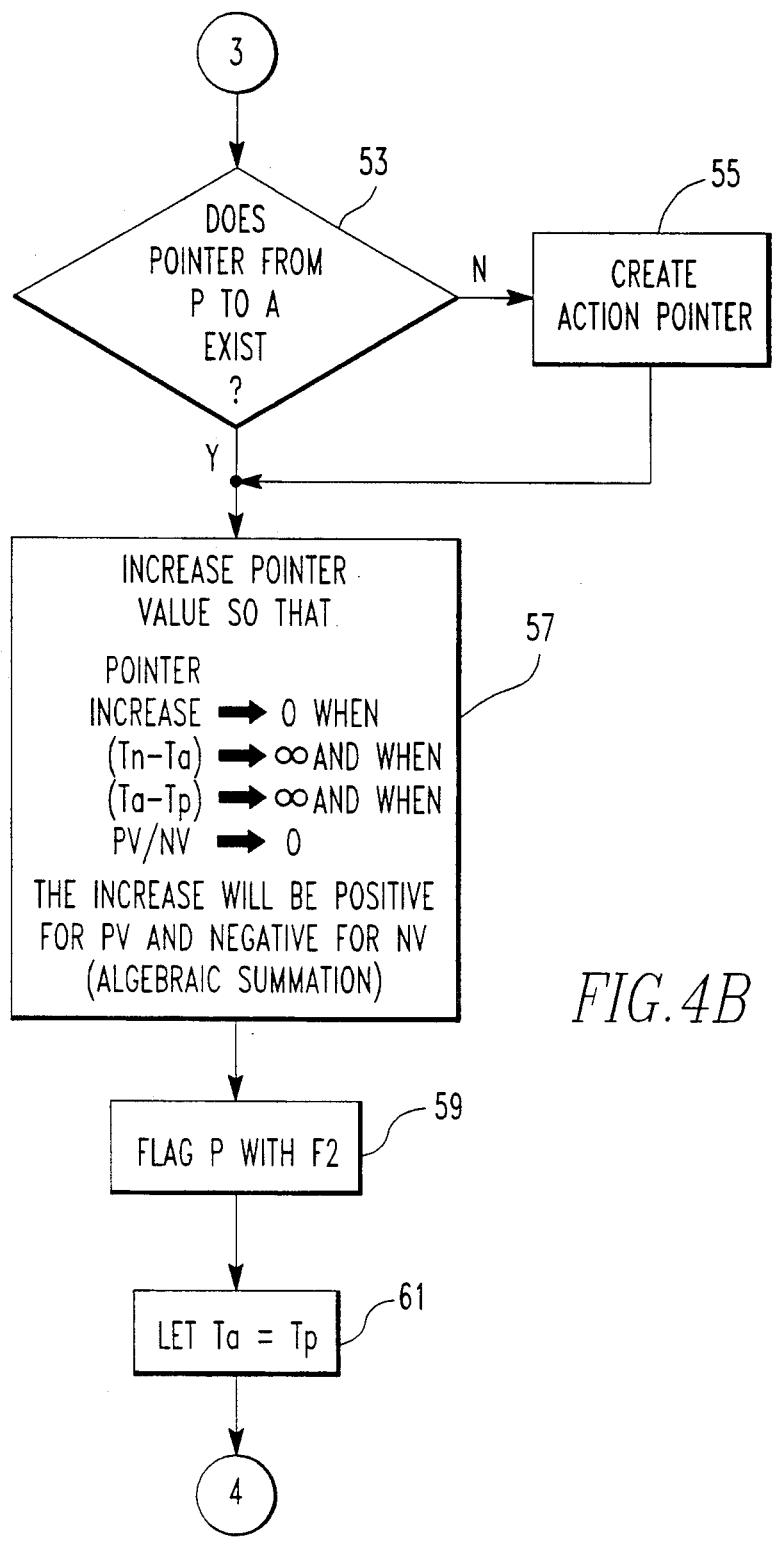

Once all the possible perceptions have been associated with such action, Ta and all F2s are restored at 63 in FIG. 4A1, and the loop restarts at 47 asking for another action which was stored some time before the previous one. The same happens if the first action had no previous perception patterns to be associated with.

When there are no more actions stored during the time window, Ta, Tn and all F1s are also restored at 65. The process goes then to the routine 1 where PV/NV are propagated. The process goes to the same routine 1 if there were no action as requested at 47.

Figure 5:
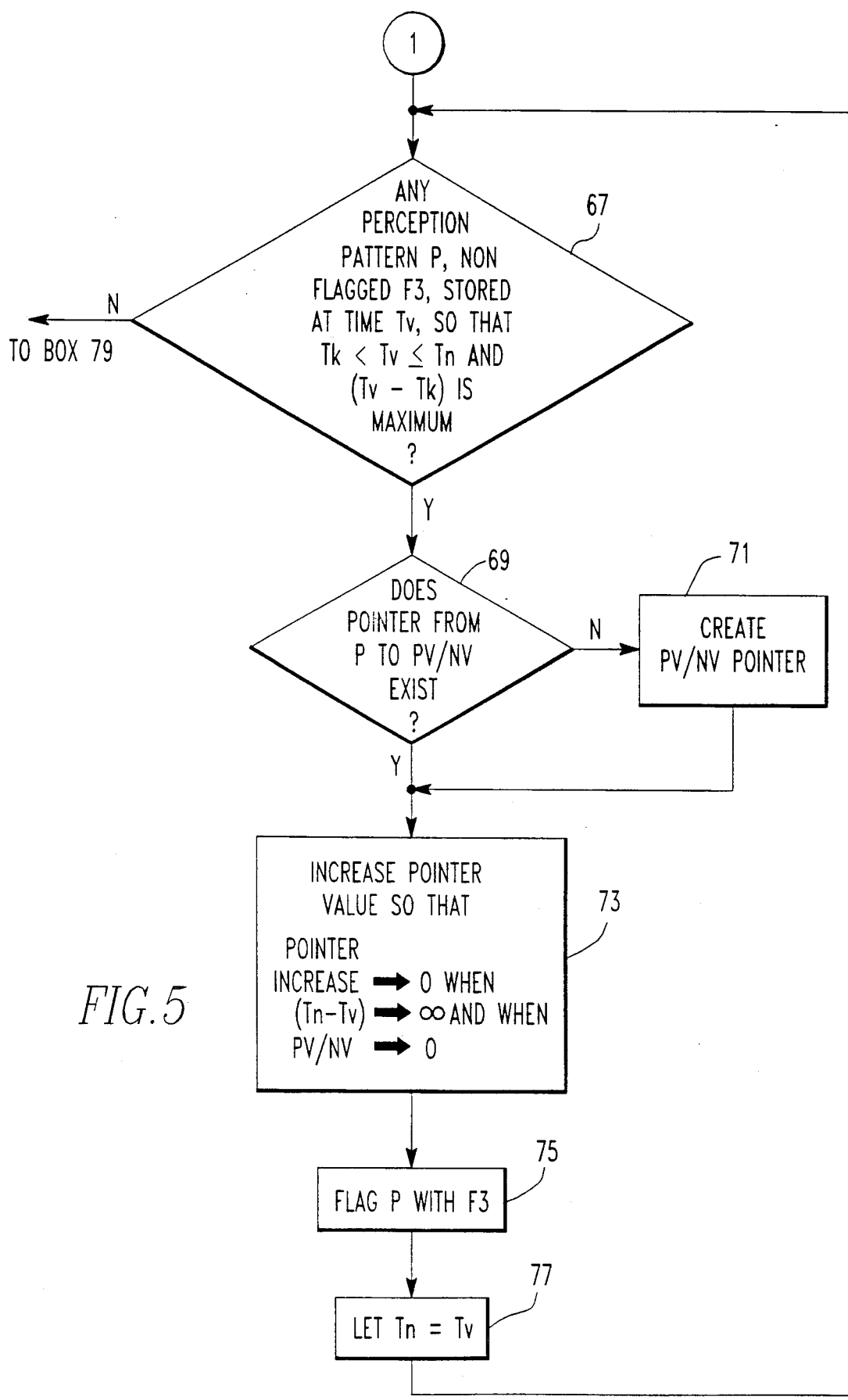
FIGS. 5 and 5A illustrate a flow chart of an additional part of the computer program suitable for implementing the perception and response association which forms part of the present invention.
Figure 5A:
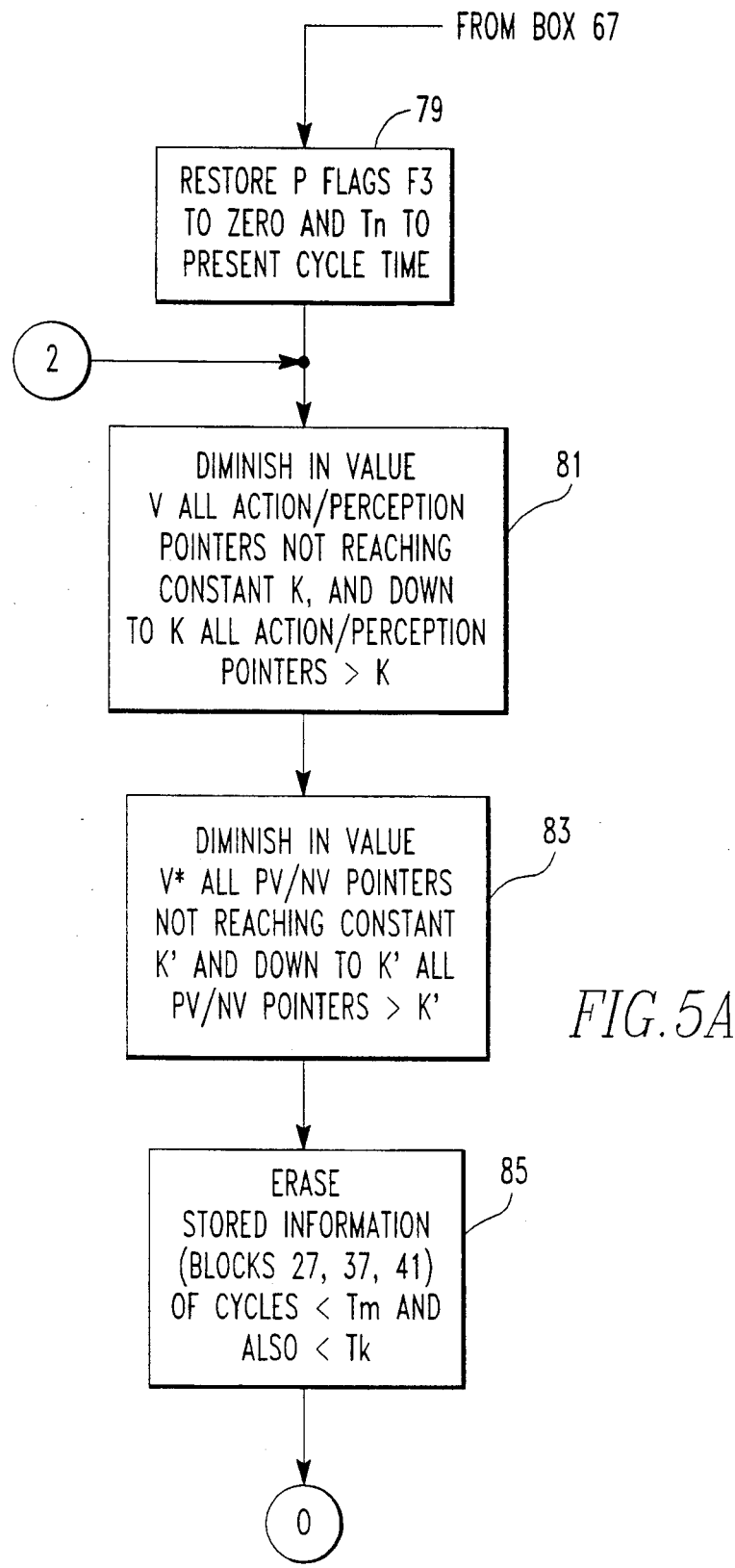
Figure 7:
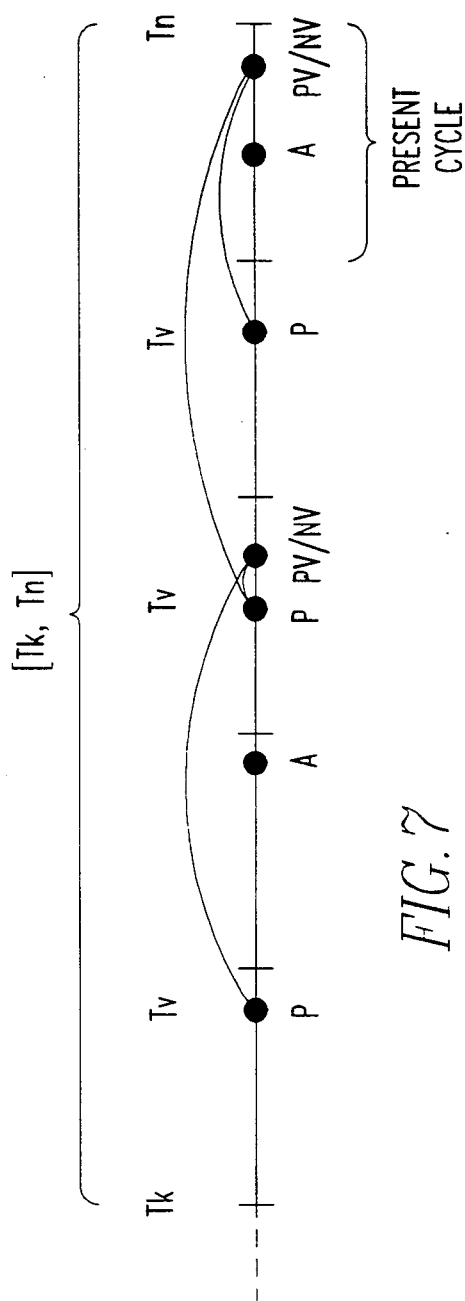
FIG. 7 is a time scale illustrating the associations between the perceptions and positive and negative responses in accordance with the invention.

FIGS. 5 and 5A illustrate routine 1. FIG. 7 illustrates the associations of PV/NVs and perception patterns, which propagate values with the same time scale as FIG. 6. The routine starts at 67 by asking for a perception pattern identification stored at 27 during the present cycle when PV or NV was detected or during the time period spanning a number of previous cycles, Tk-Tn, (Tv may be any specific time during such period), provided it is not flagged F3, and selects the one which took place nearest to the present cycle Tn.

The question is posed at 69 whether an associating pointer from the perception pattern to the PV or NV element exists, and the order is given at 71 to create one if it did not exist.

Next, the order is given at 73 to increase the value of the pointer from the perception pattern to either the PV or NV element, so that the next time such perception pattern is detected, the value of the pointer is picked up at 37. The pointer value is proportional to the proximity of the perception pattern to the present cycle. The value is also proportional to the PV or NV level and never above level K.

The perception pattern identification is then flagged at 75 with F3 and Tn is made equal to Tv at 77 before the program loops back to 67 to look for additional perceptions to associate with PV or NV. The loop 67-77 is repeated for all the perceptions which were stored during the selected number of most recent cycles, period Tk-Tn, before the present cycle.

Once all the possible perceptions have had a propagated value assigned, Tn and all F3s are restored at 79.

The process goes now to routine 2 where all pointers and PV/NV levels are diminished. This constant level-lowering process promotes the selection of the pointers and PV/NVs which have taken place more frequently and reduces the likelihood of the selection of the non-repetitive ones. Here, statistics produce a natural and logical selection process.

The routine begins at 81 by diminishing a value V of all perception/action associations which have not reached a constant value K. On the other hand, once an association has a statistical "warranty", —the strength of PV/NV is also a factor in reaching the constant value K—, it remains permanent at that constant K level. The same happens at 83 to all PV/NV pointers, so that the value propagation is also determined by statistics and PV/NV levels. The stored information (perceptions, action, PV/NV pointers) is erased at 85 when it is older than Tm and Tk, so that it will not be further used. This helps to maintain memory requirements within limits.

The process also goes to routine 2 if neither the PV nor the NV element were "on" or there were no propagated values stored at 43.

At the end of this routine 2, the process returns to 0, starting a new time cycle.

In general, the reaction time of the system 1 depends on the processing speed of the input 3, output 5 and central 7 subsystems, and the number of instructions the central subsystem has to run in one time cycle. It may be that those factors result in an elongation of the time cycle and the reactions become too slow. In this case, since the central subsystem 7 could not store the next perception until the whole process is run and the next cycle starts, many perceptions could be ignored and not processed.

In such case, several parallel processors can be used. In addition to the perception pattern input subsystem 3, and the action/robotics output subsystem 5, which work in parallel by definition, the process of the pattern association central subsystem 7 may be split in several parallel processes run in parallel central subsystems. For instance, the main part of the process, where it is asked if there are some perception and action patterns and some PV/NV, (blocks 27 to 45 in FIGS. 4A, 4A1 and 4A2) and where the corresponding perception/action and propagated PV/NV pointers are created (blocks 47 to 79 in FIGS. 4A1, 4B, 5 and 5A), could be run in one processor. Since the action/robotics output subsystem 5 is by definition a separate processor, when the order is sent from the central subsystem 7 to perform an action/inhibition at block 31, this is done in parallel. Block 81, where the values of all the perception/action associations are diminished, —and there may be a very high number of them—, may be run in a parallel central processor. Something similar happens with block 83, where the values of all propagated PV/NV pointers are diminished; due to their number, it may be advisable to run this process in another parallel central processor.

Figure 8:
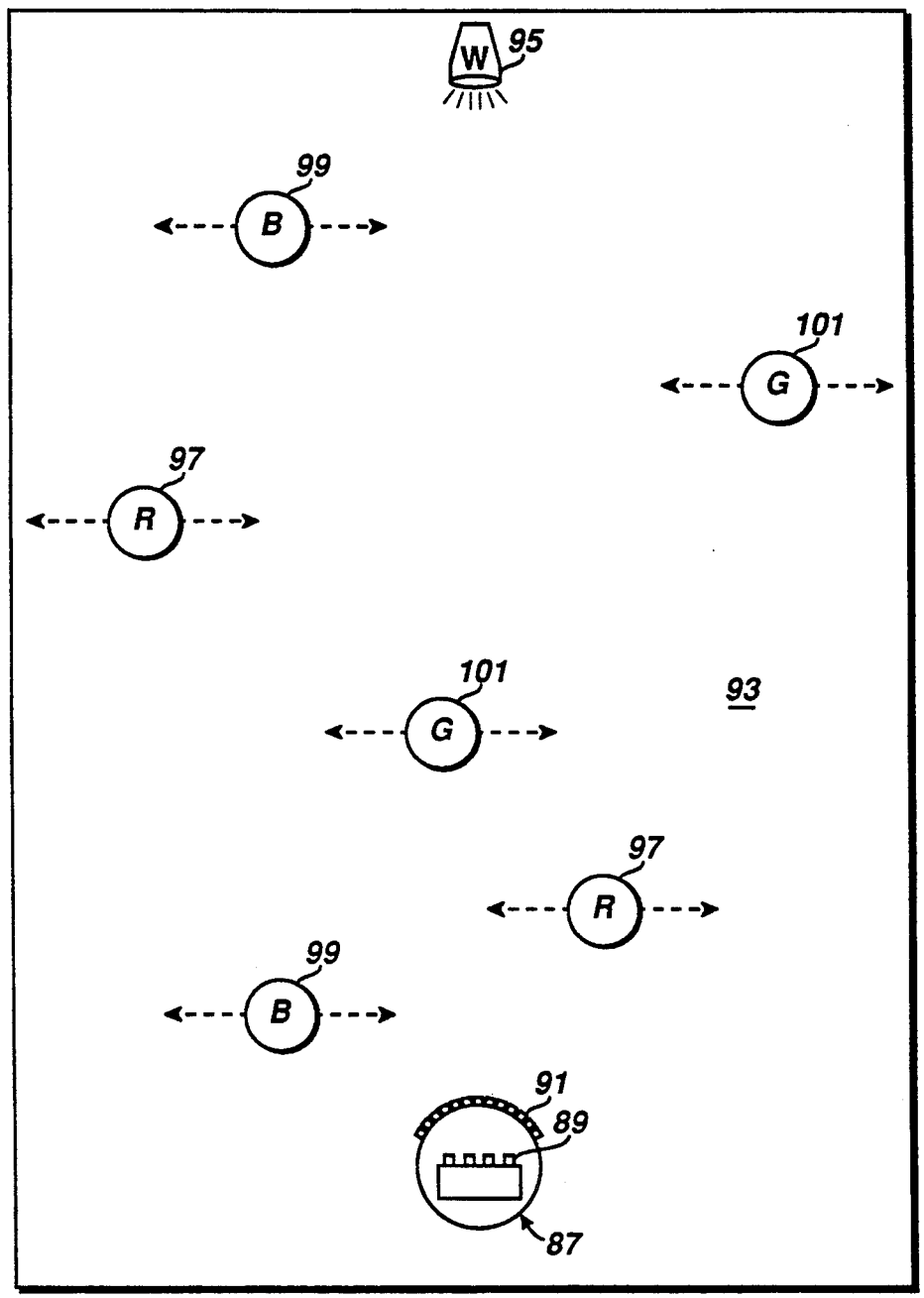
FIG. 8 is a schematic view illustrating the operation of a general purpose acting intelligent system performing in accordance with the invention.

An example of how all this system can work is illustrated in FIG. 8 with some very simple subsystems. Imagine a device "Pathfinder" 87 with an output subsystem able to move on wheels and to steer such movement.

The input subsystem 3 is able to detect a white light, as well as green, blue and red colors, through some frontal sensors 89. A number of other sensors 91 of this input subsystem, distributed through the surface of the device, allows it to detect the level of pressure when pushing or contacting another surface.

The detection of white light has been chosen as positive value, so that the PV element is actuated by the light intensity detected by the white light sensor 89. The detection of pressure has been selected as negative value, so that the NV element is activated by the intensity of pressure detected by the surface sensors 91.

We can imagine that the device stands at the end of a field 93. At the other end there is a white spotlight 95. In between there are a number of horizontally moving units of different colors and materials. Red units 97 have a hard metallic surface; blue units 99 have a medium hardness surface of cardboard; green units 101 have been covered with a soft surface of quilted tissue. The units 97, 99 and 101 move left to right and right to left, between the source of white light 95 and our device Pathfinder 87.

The device 87 moves on its wheels randomly when there is no order coming from the pattern association Central subsystem 7.

At the beginning there is absolute chaos. Our device Pathfinder 87 moves without purpose, knocks all kind of units and does not steer towards the white spotlight 95 more than in any other direction.

Then, it happens that the device perceives the white light and, due to one of its random movements, it goes towards it. The PV element receives an increased level of light intensity. Therefore, a pointer is created, with a low initial value, but already associating the frontal perception of the white light and the reaction of moving ahead.

As time passes by, this combination of perception and action will happen several times and therefore the pointer will be reinforced. Each time the white light is perceived by Pathfinder 87, it moves ahead, and gets an increased PV level, which reinforces the pointer even more.

At the same time, a number of pointers will be created, which do not represent a true relationship (e.g., the light is suddenly detected, not due to Pathfinder movement at that time, but to the random displacement of one of the units 97, 99 and 101, which was in front of it, screening the source of white light). Pathfinder 87 will repeat its previous movement when facing the same randomly moving unit, but the lack of PV results will not reinforce such pointer. On the other hand, since the value of the latter pointers permanently tends to diminish, these kinds of untrue relationships will end by disappearing.

The only perception/action pointer getting reinforced, will be the light ahead/moving ahead one.

At some other time, it happens that Pathfinder 87 is in front of a red unit 97, which screens the white light. The sensor 89 for red detects the unit color. Then, due to a random movement, Pathfinder 87 moves towards the red unit 97 and knocks it. Since the unit surface is metallic, the sensors 91 of Pathfinder send high pressure level information to the NV element. Therefore a pointer is created, with a low initial value, but already associating negatively the perception of red in front of the device and the action of moving ahead. The next time the red unit 97 is perceived in front of Pathfinder 87, it will inhibit such action, that is, it will halt. Additionally, the negative value of the high pressure has been propagated to the perception of red, since the visual and touch perceptions took place closely in time.

The same will happen when the blue and green units 99 and 101 are in front of Pathfinder 87, and it moves ahead and knocks them. Corresponding pointers will be created and reinforced.

Moreover, the pointer corresponding to the red metallic unit 97 will have a higher inhibiting value than the others, since its level must be proportional to the NV level (block 57 in FIG. 4B) which is high due to the high pressure sensed from a metallic surface (this pointer will reach the threshold for ordering the action before the other pointers reach it). This means that Pathfinder 87 will learn to stop in front of the metallic unit 97, before it learns to do so in front of the quilted or cardboard surface units 99, 101. Pathfinder 87 will start to be "cautious" first of all with the most dangerous unit.

Furthermore, it was explained previously that the value of the pointer is directly proportional to the level of PV/NV detected and inversely proportional to the elapsed time between the perception and the PV/NV time Tn or present cycle. Since, as we have seen, the detected NV level was high in the case of the metallic unit 97, the threshold for ordering Pathfinder 87 to halt can be reached with a lower value for the elapsed time, that is, with a perception red before the NV from contact with the red unit. This means that Pathfinder will stop before the metallic unit sooner than it does in front of the softer units, almost as soon as red is first seen, and at a more prudent distance than it does in front of the other two units.

All this learning process is interweaved with random movements. As previously explained, orders coming from the Central Subsystem 7 have priority over those random movements. At some other time, Pathfinder 87 sees a red metallic unit 97 in front of it. It consequently stops due to the inhibiting order not to move ahead. Any other random movement is allowed once Pathfinder is still and perceiving red. Then Pathfinder happens to move aside to its right. From that position, it can see the spotlight 95, since the red unit does not screen it anymore. A pointer is then created from the frontal perception of red to the action of moving aside to the right. This pointer will continuously increase its value as Pathfinder 87 moves aside and again perceives the white light, each time it is facing the red unit 97. Occasionally it will happen that a second unit behind may still screen the spotlight, but due to the relatively low number of units, this will be exceptional. After that, our device 87 will move ahead towards the newly seen white light, due to the previously established associating pointer.

If we analyze the movements of Pathfinder 87, it has made a detour avoiding the metallic unit 97, getting the white light 95 in sight and then moving ahead. It is an adequate dodging maneuver. Such strategy will also be learned with the other units 99, 101.

After a learning period, we can see Pathfinder 87 finding its way towards the source of white light, avoiding contact with the units 97, 99 101, being specially careful with the stronger ones 97, making dodging maneuvers, etc., an adequate strategy, for a finality (PV), avoiding problems (NV) and being continuously optimized.

Let us now follow some phases of implementation of the system of this invention where increasingly intelligent behavior can be perceived. Those implementation phases or modes are cited here as sheer examples and are not meant to be limiting.

The intelligent behavior of Pathfinder 87 could be improved if it had more sophisticated means for action than just wheels. For instance, if it had some kind of legs, it could learn to avoid contacting the units 97, 99, 101 by jumping over them.

In the case where Pathfinder 87 had more complex input sensors, perceiving not only some colors but also contours and images, it could find its way in a much more detailed and sophisticated way, going through more complex and dangerous environments.

However, the central system 7 would always work the same way, by associating some perception patterns with some actions. Its principles of association would always be the same. The possibilities of an adequate action in specific circumstances, would be richer, more sophisticated and intelligent; but this would be due to the higher level of sophistication of the input and output systems, and the variety of their patterns, while the core system would remain untouched.

This progressive improvement in the intelligent behavior of the system goes through a number of sophistication milestones. One of them is the multi-sensorial perception patterns. When the perception pattern, which is associated to an action, has been produced by the simultaneous combination of perceptions from several kinds of sensors, there is more information than if only one sensor were considered and, therefore, there is the possibility for a higher number of reactions.

For instance, the combination of simultaneous image and touch patterns would be more effective for grasping delicate objects. Handling delicate objects needs an accurate measure of the distance form the "fingers" and of their pressure, in order not to break such objects. The images, when the fingers are a millimeter nearer or farther from the object, are practically the same and, without the sense of touch, would not be able to control the distance and the pressure and to avoid breaking the delicate object. But if the only information were the touch —therefore there were no data until touching—, the finger could approach the object too fast and break it at first contact. This means that both, image and touch patterns, would be combined in one, and one "multi-sensorial" neuron 17 in the last layer of the network would be fired, when such a double perception takes place.

Another important milestone in the progressive improvement of the intelligent behavior of the system is the chain of perception patterns.

When the perception does not take just a cycle of time but several of them, there is a chain of perception patterns. This would be the case of a melody with several notes. Since the combinations of notes in several cycles (e.g., a trumpet-call) is much higher than the number of different notes in one cycle, the possibilities for a richer number of reactions from such melody are also higher. In general, a chain of perception patterns gives more input information and, therefore, there is the possibility of a higher variety of adequate actions, a better adapt to the environment.

Nevertheless, the chain of patterns is formed exactly in the same simple way as one instantaneous pattern. The instantaneous pattern has the most repetitive features from a number of previous similar perceptions. The chain of patterns has several of those. But the way to group them is the same as before: the most repetitive instantaneous patterns from a number of similar chains of patterns. One only neuron 17 in the last layer of the network would represent all the step-patterns, thus becoming a non-instantaneous pattern neuron.

If we go a bit further, the milestone would be the simultaneous combination of multi-sensorial patterns and chains of patterns, which enrich even more the variety of perception combinations and therefore the possible reactions and the sophistication of the system's behavior.

Something similar can be said about the action. Multiple reactions (movement of several limbs) may occur in the same cycle. Or a chain of simple or multiple reactions (a complex movement of one or several limbs) may take place. Those one cycle multiple reactions and chains of reactions provide a much richer variety of outputs.

The possibility of creating action patterns with a neural network in the Output Subsystem as in FIG. 2, would give a much richer number of outputs than a fixed number of fixed individual actions and would provide a simple way to call a chain of multiple actions through only one trigger (23 in FIG. 2). This output richness maps the input one, since little could be done if the system could perceive with great sophistication, but would be able to react only with a few number of actions. The variety of perception patterns would be a waste. The combination of two richer spectra of inputs and outputs increases the general sophistication, leading to a more intelligent behavior of the system.

Finally, let us consider another important phase, milestone or mode of operation. Since there are instantaneous and chain patterns, several of them may become active at the same time; that is, several neurons 17 in the last layer may be fired in the same cycle. Pathfinder may perceive the red unit 97 in front of it, but it can also have a chain of the perceptions from the last few cycles. For instance, let us imagine that the units 97, 99 and 101 could also move towards Pathfinder 87 and not only horizontally in the field 93. The red unit 97 could have been moving at some speed towards Pathfinder during the most recent cycles of time. Pathfinder's reaction should not be the same for both perception patterns, the same way that our reaction will not be the same, facing a stopped car, or seeing the same car approaching us at some speed, even if the the last cycle image would have been the same.

That is why block 25 in the flow chart (FIG. 4) asks if some patterns -in plural- have been perceived. Block 31 decides that the perception pattern with the highest pointer value is the one which calls the action, consequently, since, assuming the same Pathfinder's movement, the impact with an incoming red metallic unit 97 would be stronger than that with a still unit, the device will react going backwards (previously learned action, thanks to some random movements in the other cases) rather than stopping.

Once rolling backwards, it happens that the red unit 97 accelerates its movement towards Pathfinder 87. A new chain of the patterns perceived during the acceleration cycles would become active (an element 17 in FIG. 3). We have seen in the flow chart that, at every time cycle, it is asked if a perception pattern with a pointer to an action exists, and, if so, the corresponding order to the output subsystem 5 is sent. This means that, even if the output subsystem 5 is involved in an already triggered chain of actions, since it is a slave system, it is always open to any incoming order from the master central subsystem 7. Therefore the element 17 representing the new chain of perceptions will activate the action of accelerating Pathfinder's movement backward, assuming it learned that before. This last characteristic which gives priority to the central subsystem orders, even when a chain of actions has already been triggered, gives the system the capability to "adapt" any action routine to the particular and changing environmental conditions, as in a "feedback" process.

In short, the more sophisticated the subsystems of perception pattern input 3 and the action/robotics output 5, the higher the learning capacity and the more intelligent is the general purpose system 1, using always the same pattern association central subsystem 7.

This general purpose process for input/output and perception action association of the present invention may be used in a wide variety of applications; very specific ones, such as Pathfinder, or very general purpose ones, where the full potential of the invention becomes more clearly apparent.

The invention may be embodied in may implementations. The central subsystem, process may be performed by software as described above, but may be also built in hardware. In the latter case, for instance, all perception neurons 17 in the last layer would be physically connected to all triggers 23 of the action/robotics output subsystem 5. Each of those physical connections would have a pointer element, which would weight positively or negatively the signal form the perception input subsystem 3 to the action/robotics output subsystem 5. This structure would be similar to a neural network, with neurons and weights. The elements PV and NV would be connected to all pointers, so that, when active, they would increase or decrease the value of those pointers. This value would permanently diminish. Therefore, the statistical occurrence of a perception pattern, an action and a PV would increase the pointer value, and trigger the action the next time the perception pattern is recalled. The opposite would happen when an NV is detected.

In order to avoid overly complex connectivity, several variations are possible. For instance, the PV and NV elements could transmit a special frequency throughout the whole network, which would only activate the pointer elements, the rest of the network being transparent to it. This would avoid interconnecting all pointers with the PV/NV elements.

The process may also be embodied in a mixed hardware and software system. Hardware, for instance, is especially useful for diminishing the pointer values, all at the same time, which, in software, may become a cumbersome routine, pointer by pointer. Hardware may also be very useful for perception patterns and actions frequently associated (the robot's hands and fingers touch patterns and movements); or the image patterns and focus/diaphragm/aiming movements of the camera). A hardware embodiment would give a higher performance to those associations of perception patterns and movements, which may be very convenient, since they happen frequently and need fast reactions. Other parts of the process could be performed in software.

As previously stated, this process of the pattern association central subsystem 7, when implemented fully in software, may be performed by one or several parallel processors.

Also, the pattern association central process may be inlaid in the input process, in the output process, or interwoven with both.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An acting intelligent system comprising:
   input means including input sensors responsive to selected external stimuli to generate input signals, perception means responsive to said input signals to generate perception pattern signals classifying by similarity various input signals and combinations of input signals, and evaluation means for comparing specified external stimuli to selected evaluation criteria to selectively generate positive and negative response signals;

output means for generating selected output actions which directly or indirectly result over time in changes in at least one of said selected and specified external stimuli; and processing means including means for generating association signals associating specified output actions with said perception pattern signals statistically based upon a repetition and a proximity in time of said perception pattern signals, said selected output actions, and said positive and negative response signals, and means for selecting said selected output actions to be generated by said output means based upon said association signals.

2. The system of claim 1 wherein said means generating said association signals includes means for assigning assigned values to said association signals, said assigned values being positive for an association of a perception pattern signal and an output action with a positive response signal and said assigned value being negative for an association of a perception pattern signal and an output action with a negative response signal, and wherein said means for selecting said selected output actions selects an output action from an association with a positive association value and inhibits selection of an output action from an association with a negative association value.

3. The system of claim 2 wherein said means for assigning values for said association signals includes means for increasing an assigned value in magnitude for each association which is repeated and decreasing in magnitude over time the assigned values of associations not repeated.

4. The system of claim 3 wherein said means for decrease in magnitude over time assigned values which have reached a predetermined level at which the assigned value of such association is maintained.

5. The system of claim 2 wherein said evaluation means includes means for varying a level of the positive and negative response signals based upon an intensity of the specified external stimuli, and wherein said means assigning values to said association signals, assigns said assigned values taking into account the level of the positive and negative response signals, and wherein said means for selecting a selected output actions selects as said selected output action, or inhibits the output action of the association with the greatest magnitude.

6. The system of claim 5 wherein said means for assigning assigned values to said association signals increases in magnitude the assigned value of the association signal for each association which is repeated and decreases in magnitude over time the assigned values of the association signals for associations not repeated.

7. The system of claim 5 wherein said means generating association signals includes means for generating response propagation signals associating perception pattern signals and response signals statistically based upon repetition and time proximity of said perception pattern signals to following response signals, and wherein the means assigning values to said association signals includes means assigning values based also upon said response propagation signals.

8. The system of claim 7 including means for assigning said response propagation signals values which are increased in magnitude for associations between perception pattern signals and following response signals which are repeated and decreased in magnitude over time for associations between perception pattern signals and following response signals which are not repeated, and wherein said means for assigning values to said association signals uses as said level of said response signal the greater of the intensity of said specified external stimuli and the magnitude of said response propagation signals.

9. The system of claim 8 wherein said response signals and response propagation signals may each have simultaneous positive and negative values and wherein the final value of the response signal and response propagation signal from which the output action is selected or inhibited is the algebraic summation of the positive value and the negative value.

10. The system of claim 8 wherein said response propagation signals values which have reached a predetermined level are not decreased in magnitude over time and are maintained at such level.

11. The system of claim 1 wherein said processing means for includes means for generating response propagation signals associating perception pattern signals and response signals statistically based upon repetition and time proximity of said perception pattern signals to following response signals, and wherein said means for selecting or inhibiting said selected output action includes means for selecting output actions based also upon said response propagation signals.

12. The system of claim 1- wherein said means for selecting said selected output actions includes means for selecting a random output action as a selected output action to be generated by said output means in response to a perception pattern signal generated by said input means for which no association signal associating that perception pattern signal with an output action has been generated.

13. The system of claim 1 wherein said perception means comprise one of a neural network and an expert system.

14. The system of claim 13 wherein said neural networks comprise unsupervised neural networks.

15. The system of claim 1 wherein said output means comprises one of a neural network and an expert system dedicated to generate output action patterns classifying by similarity various output actions and combinations of output actions.

16. The system of claim 15 wherein said neural network comprises an unsupervised neural network.

17. An acting intelligent system comprising:
input means including input sensors responsive to selected external stimuli to generate input signals, perception means responsive to said input signals to generate perception pattern signals classifying by similarity various input signals and combinations of input signals, and evaluation means comparing specified external stimuli to selected evaluation criteria to selectively generate positive and negative response signals;

output means generating selected output actions which directly or indirectly result over time in changes in at least one of said selected and specified external stimuli; and processing means generating and storing association signals associating output actions, perception pattern signals and response signals, said processing means strengthening association signals for associations which repetitively produce positive response signals and selecting as a selected output action to be generated by the output means an output action with the strongest association to current perception pattern signals.

18. The system of claim 17 wherein said processing means includes means for weakening over time association signals for associations which are not repeated.

19. The system of claim 17 wherein said processing means includes means for selecting as said selected output action a random action when no association signal has been established for an association between current perception pattern signals and an output action.

20. The system of claim 17 wherein said processing means includes means for generating response propagation signals associating perception pattern signals and response signals, said processing means strengthening said response propagation signals for associations between perception pattern signals and response signals which repetitively include a positive response signal, and including said response propagation signals in selecting said selected output actions.

* * * * *

UNITED STATES PATENT AND TRADEMARK OFFICE
CERTIFICATE OF CORRECTION

PATENT NO. : 5,321,795

DATED : June 14, 1994

INVENTOR(S) : Santiago Alvarez de Toledo

It is certified that error appears in the above-indentified patent and that said Letters Patent is hereby corrected as shown below:

Column 3, line 19, after "FIGS." add -- 4A --, and "illustrates" should be --illustrate --.

Column 8, line 32, after "FIGS." add -- 4A --.

Claim 4, column 17, line 33, after "for" -- assigning values to said association signals does not -- should be inserted.

Signed and Sealed this

Fourteenth Day of March, 1995

Attest:

BRUCE LEHMAN

Attesting Officer

Commissioner of Patents and Trademarks